(12) United States Patent
Mleczko

(10) Patent No.: US 10,313,597 B2
(45) Date of Patent: Jun. 4, 2019

(54) VEHICLE VISION SYSTEM CAMERA WITH ADJUSTABLE FOCUS

(71) Applicant: MAGNA ELECTRONICS INC., Auburn Hills, MI (US)

(72) Inventor: Jamie A. Mleczko, Washington, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 305 days.

(21) Appl. No.: 15/229,519

(22) Filed: Aug. 5, 2016

(65) Prior Publication Data

US 2017/0048463 A1    Feb. 16, 2017

Related U.S. Application Data

(60) Provisional application No. 62/203,651, filed on Aug. 11, 2015.

(51) Int. Cl.
| | | |
|---|---|---|
| *B60R 1/00* | (2006.01) | |
| *H04N 5/232* | (2006.01) | |
| *G02B 7/04* | (2006.01) | |
| *H04N 5/225* | (2006.01) | |

(52) U.S. Cl.
CPC .......... *H04N 5/23296* (2013.01); *B60R 1/00* (2013.01); *G02B 7/04* (2013.01); *H04N 5/2252* (2013.01); *H04N 5/2253* (2013.01); *B60R 2300/307* (2013.01)

(58) Field of Classification Search
CPC .... H04N 5/23296; H04N 5/2252; B60R 1/00; G02B 7/04

USPC ......................................................... 348/148
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,715,093 A | 2/1998 | Schierbeek et al. |
| 5,760,962 A | 6/1998 | Schofield et al. |
| 5,796,094 A | 8/1998 | Schofield et al. |
| 5,877,897 A | 3/1999 | Schofield et al. |
| 5,949,331 A | 9/1999 | Schofield et al. |
| 6,201,642 B1 | 3/2001 | Bos |
| 6,313,454 B1 | 11/2001 | Bos et al. |
| 6,320,176 B1 | 11/2001 | Schofield et al. |
| 6,353,392 B1 | 3/2002 | Schofield et al. |
| 6,369,954 B1 | 4/2002 | Berge et al. |
| 6,396,397 B1 | 5/2002 | Bos et al. |
| 6,498,620 B2 | 12/2002 | Schofield et al. |
| 6,559,435 B2 | 5/2003 | Schofield et al. |
| 6,590,719 B2 | 7/2003 | Bos |
| 6,690,268 B2 | 2/2004 | Schofield et al. |
| 6,717,610 B1 | 4/2004 | Bos et al. |
| 6,757,109 B2 | 6/2004 | Bos |
| 6,806,452 B2 | 10/2004 | Bos et al. |

(Continued)

*Primary Examiner* — Nguyen T Truong
(74) *Attorney, Agent, or Firm* — Honigman LLP

(57) ABSTRACT

A camera for a vision system of a vehicle includes a housing, an imager and a lens assembly. The imager is disposed in the housing and includes a pixelated imaging array having a plurality of photosensing elements. The imager captures image data. The lens assembly is disposed at the housing. The imager is disposed at an adjustment device in the housing. The adjustment device is operable, responsive to a control signal, to adjust a position of the imager relative to the housing and the lens assembly.

20 Claims, 3 Drawing Sheets

(56) References Cited

U.S. PATENT DOCUMENTS

| | | |
|---|---|---|
| 6,822,563 B2 | 11/2004 | Bos et al. |
| 6,824,281 B2 | 11/2004 | Schofield et al. |
| 6,831,261 B2 | 12/2004 | Schofield et al. |
| 6,853,507 B2 | 2/2005 | Ryu et al. |
| 6,922,292 B2 | 7/2005 | Bos |
| 6,946,978 B2 | 9/2005 | Schofield |
| 7,004,606 B2 | 2/2006 | Schofield |
| 7,005,974 B2 | 2/2006 | McMahon et al. |
| 7,031,071 B2 | 4/2006 | Nishioka |
| 7,038,577 B2 | 5/2006 | Pawlicki et al. |
| 7,083,096 B2 | 8/2006 | Breytman et al. |
| 7,123,168 B2 | 10/2006 | Schofield |
| 7,382,545 B2 | 6/2008 | Jung et al. |
| 7,720,580 B2 | 5/2010 | Higgins-Luthman |
| 7,855,755 B2 | 12/2010 | Weller et al. |
| 7,965,336 B2 | 6/2011 | Bingle et al. |
| 8,179,438 B2 | 5/2012 | Hayakawa et al. |
| 8,542,451 B2 | 9/2013 | Lu et al. |
| 9,376,066 B2 | 6/2016 | Lu |
| 2005/0167862 A1 | 8/2005 | Sano |
| 2005/0270486 A1 | 12/2005 | Teiwes et al. |
| 2006/0232670 A1 | 10/2006 | Chu |
| 2007/0279365 A1 | 12/2007 | Kageyama |
| 2008/0106811 A1 | 5/2008 | Eromaki |
| 2009/0244361 A1 | 10/2009 | Gebauer et al. |
| 2010/0007807 A1 | 1/2010 | Galstian et al. |
| 2010/0243862 A1 | 9/2010 | Nunnink |
| 2010/0265048 A1 | 10/2010 | Lu et al. |
| 2010/0289885 A1 | 11/2010 | Lu et al. |
| 2012/0062743 A1 | 3/2012 | Lynam et al. |
| 2012/0154591 A1 | 6/2012 | Baur et al. |
| 2012/0218414 A1 | 8/2012 | Bobbitt et al. |
| 2013/0258140 A1* | 10/2013 | Lipson .............. G03B 3/10 348/240.3 |
| 2014/0313337 A1* | 10/2014 | Devota .............. B60R 11/04 348/148 |
| 2014/0313339 A1 | 10/2014 | Diessner |
| 2014/0340510 A1 | 11/2014 | Ihlenburg et al. |
| 2015/0222795 A1 | 8/2015 | Sauer et al. |
| 2016/0006922 A1* | 1/2016 | Boudreau ........ H04N 5/23206 348/207.1 |
| 2016/0268716 A1 | 9/2016 | Conger et al. |

\* cited by examiner

VEHICLE VISION SYSTEM CAMERA WITH ADJUSTABLE FOCUS

CROSS REFERENCE TO RELATED APPLICATION

The present application claims the filing benefits of U.S. provisional application Ser. No. 62/203,651, filed Aug. 11, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle. The camera comprises an imager and a lens and has an adjustable focus, whereby the imager is adjustably positioned relative to the lens or lens assembly (and camera housing) to adjust the focus or focal length of the camera.

These and other objects, advantages, purposes and features of the present invention will become apparent upon review of the following specification in conjunction with the drawings.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
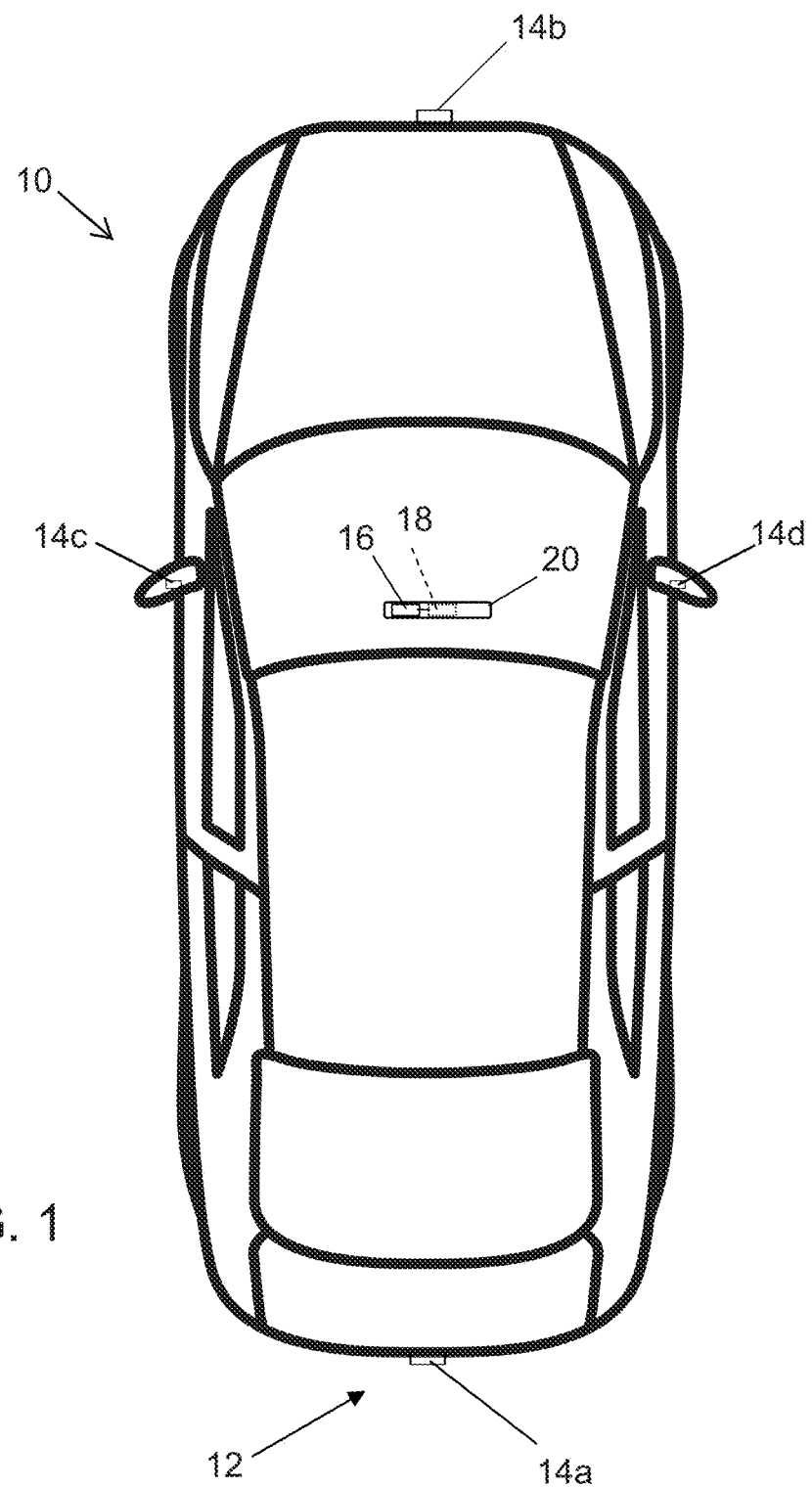
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
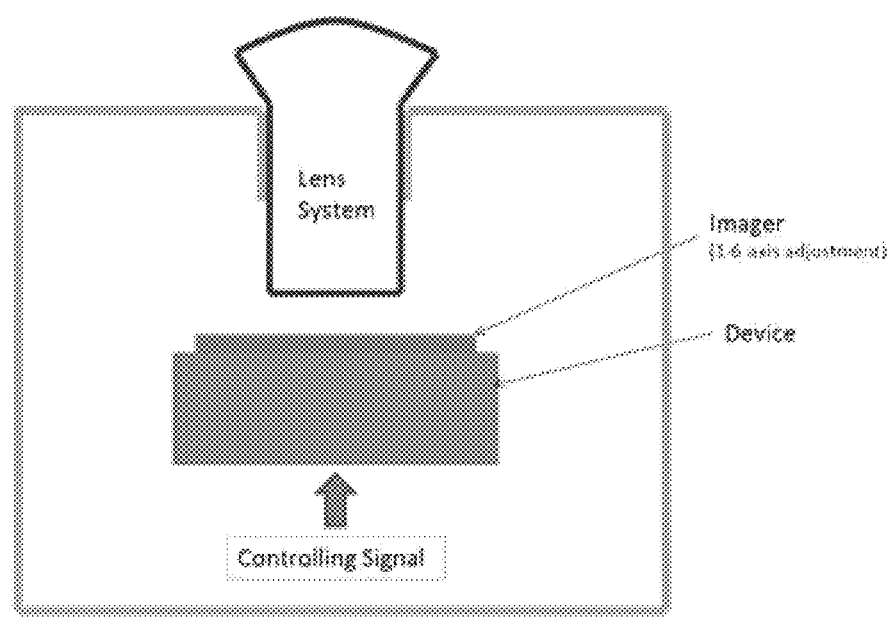
FIG. 2 is a schematic showing a camera and lens system having an adjustably positioned imager in accordance with the present invention.

As shown in FIG. 2, the camera or cameras of the present invention include a housing that supports a lens or lens assembly or lens system and an imager, which is disposed at a control device in the housing. The control device receives a controlling signal (such as responsive to a user input or an automatic control signal or the like) and adjusts a position of the imager relative to the lens to establish the desired or selected or appropriate focus or focal length of the camera.

Typically, a camera may have a lens that is initially (during assembly of the camera) adjustable relative to an imager to provide an active focus of the camera. For such cameras, an external means is provided during camera assembly to move a lens in any degree of freedom desired and then permanently retain the lens in the desired or appropriate position.

Optionally, the camera may provide a passive focus by moving the lens relative to the imager. Such cameras have an imager in a fixed position, with a lens system in a fixed position relative to the imager, and then by some non-contact means the lens or a portion of the lens is moved to adjust focus and or zoom. This non-contact method can be repeatedly adjusted or changed as needed via any non-contact method. Examples of such non-contact methods are thermal, electrical, magnetic and/or the like.

The present invention provides a camera having a passive focus that is achieved by moving the imager relative to the lens. The camera moves the image plane of the imager by a non-contact means and can repeatedly adjust or change the image plane position as needed or desired.

As shown in FIG. 2, the imager is mounted on an adjustment device that is operable to move the imager relative to the lens system. The device has the ability to move in as many degrees of freedom as desired such as one or two degrees of freedom to six degrees of freedom depending on the particular application and desired adjustment capabilities of the camera). The device may be controlled by any suitable control signal, such as by thermal, electrical, magnetic or other signals or means or the like. Thus, a change in the controlling signal causes a physical change in the position of the imager. The device provides a mounting platform for imager and also provides a means of passing electrical signals to and/or from the imager (such as control signals to the imager and image data signals from the imager). The mounting platform may be separate from the printed circuit board of the camera that supports the camera circuitry (whereby the mounting platform and imager are electrically connected to the camera circuitry on the separate circuit board, such as via electrically conductive leads or traces that may pass through the adjustment device or otherwise within the camera housing) and/or may be part of the printed circuit board of the camera (whereby the circuit board may be adjustably positioned in the housing).

Figure 3:
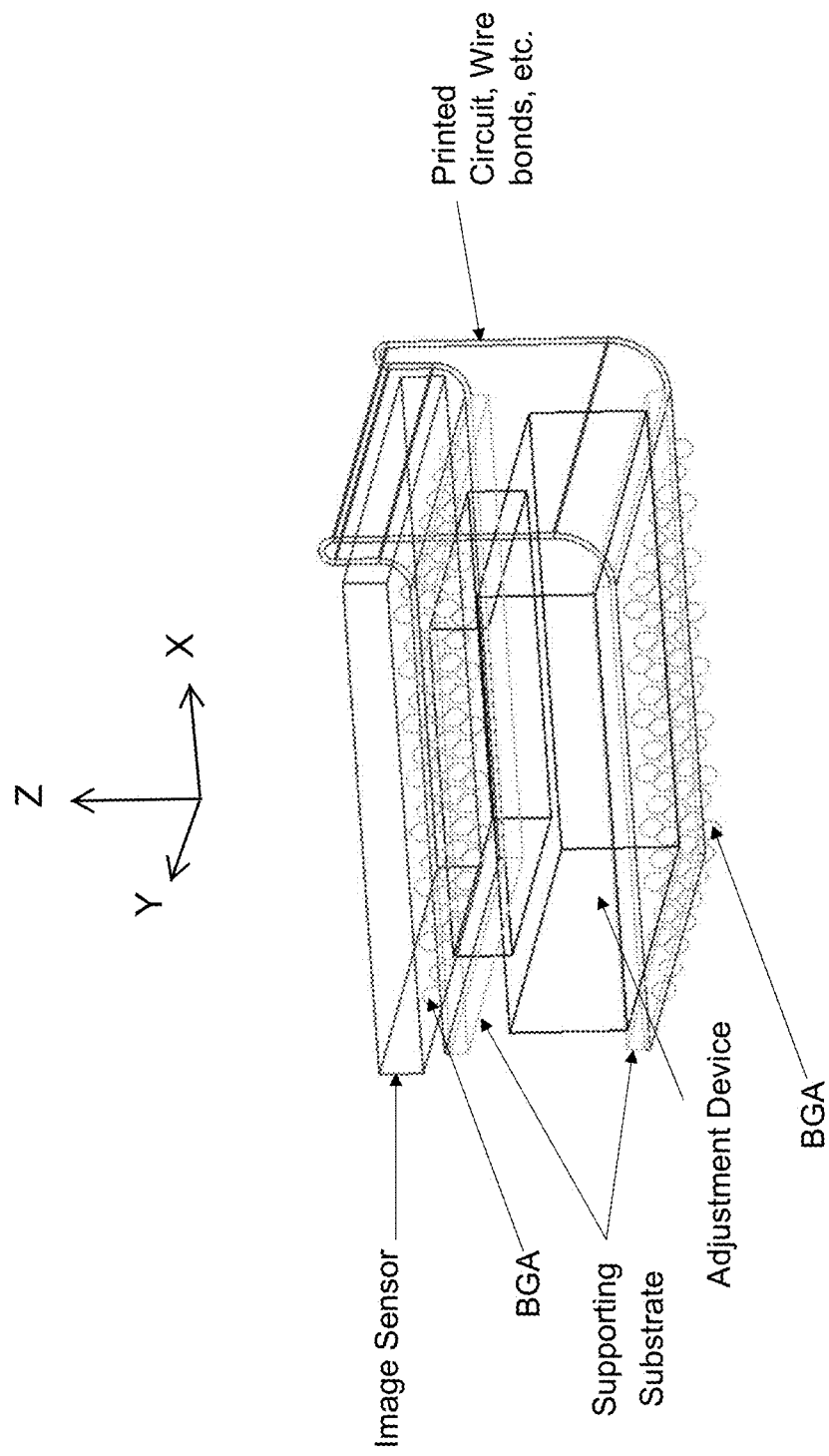
FIG. 3 is a schematic showing an image sensor adjustment device in accordance with the present invention.

Optionally, and such as shown in FIG. 3, an adjustment device or actuator includes a base portion at a supporting substrate (which may be attached or soldered at a printed circuit, such as via a ball grid array (BGA) or the like) and an adjustable portion that is movable relative to the base portion responsive to a control signal. The adjustable portion is attached at a supporting substrate, which is attached to the printed circuit, and the image sensor is attached or soldered at the printed circuit, such as via a ball grid array (BGA) or the like. Thus, movement or adjustment of the adjustable portion relative to the base portion adjusts the position of the image sensor relative to the base portion (and thus relative to the lens assembly, which is fixed relative to the base portion when the camera assembly or module is assembled). The printed circuit comprises a flexible connection between the portions attached at the supporting substrates, such that the connection flexes to allow for adjustment of the adjustable portion and image sensor relative to the base portion of the adjustment device. For example, the printed circuit may comprise two spaced apart circuit elements or boards, with a flexible connection portion or ribbon cable or the like electrically connecting to circuitry at each of the circuit elements or boards.

Optionally, the camera may include a microelectromechanical system (MEMS) actuator for the device. Optionally, the camera may utilize any other suitable methods or technologies. Basically, the imager of the camera of the present invention is mounted on a "floating" platform, which may allow for 1-6 axes of adjustment. This platform can move in the Z direction (towards and away from the lens) allowing physical positioning in the Z direction and may also allow for adjustment of pitch and yaw (3 degrees of motion), and also allows for rotation of the imager and for lateral movement (X and Y directions—generally parallel to the plane of the imager or actuator or adjustment device) of the imager relative to the lens assembly and housing. The movement of the platform is controlled by an electrical circuit.

For example, and again with reference to FIG. 3, the base portion or structure and adjustable or movable portion or structure may be an MEMS actuator. The flexible printed circuit has a ball grid array on its lower or bottom side (for soldering to a main printed circuit board (PCB) or the like) and an FR4 stiffener on the back side (for mechanical support to keep the flex circuit flat). Adhered to the stiffener is the bottom side or base portion of the MEMS actuator. Mounted to the movable structure of the MEMS actuator is another stiffener. Attached to this stiffener is the flex circuit. On the other side of the flex circuit is the corresponding ball grid array. Soldered to this ball grid array is the imager sensor. In this configuration, the flex circuit transfers the electrical signals from main PCB to the imager. The MEMS actuator may comprise any suitable type of actuator, such as, for example, a thermal bimorph type, which is an electromechanical component that responds to electrical signals with change in mechanical position.

During operation, the actuator may move the movable portion in any direction, such as horizontally across or parallel to the surface of the base portion, or vertically towards or away from the base portion, or any combination of movements to achieve the desired position of the imager. The flex circuit flexes to allow for movement of the movable portion (and imager) relative to the base portion (and main PCB). As can be seen in FIG. 3, the flex circuit has a length between the ball grid arrays that allows for such relative movement. The adjustment device is thus operable, responsive to the control signal, to (i) adjust the imager in horizontal directions (such as lateral directions across or parallel to the surface of the base portion) and (ii) adjust the imager in vertical directions (such as towards or away from the base portion of the actuator), (iii) tilt the imager about an axis across the imager (such as an axis generally parallel to the mating surface of the supporting substrate at the imager), and (iv) rotate the imager about an axis through the imager (such as an axis that may be parallel to or near parallel to an optic axis of the lens at which the imager is aligned). The actuator thus can execute lateral movement of the imager relative to the lens assembly, movement of the imager towards and away from the lens assembly, and yaw, roll and/or pitch movement of the imager relative to the lens assembly. The adjustment device or actuator thus can adjust the imager about multiple degrees of freedom and may adjust a lateral position of the imager (generally normal to the optic axis of the lens) and a focus position of the imager (towards or away from the lens) and a tilt or rotation of the imager, in order to achieve the desired or appropriate focus and alignment of the imager with the lens.

Therefore, the present invention provides a vehicle vision system camera that has an adjustable focus via a device within the camera that adjusts the position of the imager relative to the lens or lens assembly or lens system. The device, responsive to a control signal, may move the imager towards or away from the lens to adjust the focus, and/or may tilt the imager's image plane and/or may move the imager laterally relative to and normal to an optical axis of the lens. The control signal may be generated or communicated responsive to a user input (such as an input by the driver of the vehicle to adjust the focus of the camera from a near field focus to a far field focus or the like) or responsive to actuation of a vehicle accessory or system (such as adjustment to a near field focus for a front camera during a parking maneuver and adjustment to a far field focus during forward driving maneuvers along a road) or may be responsive to image processing of image data captured by the camera, where the image processor determines that the camera is out of focus or otherwise needs to adjust the imager position relative to the lens to achieve the desired or appropriate captured image data. The present invention thus provides for active adjustment of the focus of a camera by adjusting the imager or image plane relative to the lens or lens assembly or lens system of the camera.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0211009; 2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/0222593; 2013/0300869; 2013/0278769; 2013/0258077; 2013/0258077; 2013/0242099; 2013/0215271; 2013/0141578 and/or 2013/0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

The imaging device and control and image processor and any associated illumination source, if applicable, may comprise any suitable components, and may utilize aspects of the cameras (such as various imaging sensors or imaging array sensors or cameras or the like, such as a CMOS imaging array sensor, a CCD sensor or other sensors or the like) and vision systems described in U.S. Pat. Nos. 5,760,962; 5,715,093; 6,922,292; 6,757,109; 6,717,610; 6,590,719; 6,201,642; 5,796,094; 6,559,435; 6,831,261; 6,822,563; 6,946,978; 7,720,580; 8,542,451; 7,965,336; 7,480,149; 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and/or 6,824,281, and/or International Publication Nos. WO 2009/036176; WO 2009/046268; WO 2010/099416; WO 2011/028686 and/or WO 2013/016409, and/or U.S. Pat. Publication Nos. US 2010-0020170 and/or US-2009-0244361, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A camera for a vision system of a vehicle, said camera comprising:
   a housing;
   an imager disposed in said housing and comprising a pixelated imaging array having a plurality of photosensing elements, said imager operable to capture image data;
   a lens assembly disposed at said housing;
   wherein said imager is disposed at an adjustment device in said housing, and wherein said adjustment device, responsive to a control signal, adjusts a position of said imager relative to said housing and said lens assembly; and
   wherein said adjustment device, responsive to the control signal, (i) adjusts said imager relative to said housing and said lens assembly in directions parallel to a plane of said imager, and (ii) adjusts said imager relative to said housing and said lens assembly in directions normal to the plane of said imager.

2. The camera of claim 1, wherein said camera is configured to be disposed at a vehicle so as to have a field of view exterior of the vehicle.

3. The camera of claim 1, wherein said adjustment device is operable to adjust the position of said imager to adjust a focus of said camera.

4. The camera of claim 1, wherein said adjustment device, responsive to the control signal, (i) adjusts a pitch of said imager relative to said housing and said lens assembly and/or (ii) adjusts a yaw of said imager relative to said housing and said lens assembly.

5. The camera of claim 1, wherein said adjustment device, responsive to the control signal, (i) tilts said imager about an axis parallel to the plane of said imager, and/or (ii) rotates said imager about an axis normal to the plane of said imager.

6. The camera of claim 1, wherein said control signal comprises one selected from the group consisting of (i) a user input signal indicative of a user input of the vehicle, (ii) a control signal responsive to actuation or control of an accessory or system of the vehicle, and (iii) a control signal responsive to image processing of image data captured by said imager.

7. The camera of claim 1, wherein said adjustment device comprises a microelectromechanical system actuator.

8. The camera of claim 1, wherein said adjustment device comprises a base portion and a movable portion that is movable relative to said base portion responsive to the control signal.

9. The camera of claim 8, wherein said base portion is affixed at a main circuit board of said camera and wherein said imager is affixed at said movable portion of said adjustment device.

10. The camera of claim 9, wherein a flexible circuit electrically connects said imager with said main circuit board.

11. The camera of claim 10, wherein said flexible circuit has a first end electrically connected with said main circuit board and a second end electrically connect at said imager.

12. The camera of claim 11, wherein said first end of said flexible circuit is disposed between said main circuit board and said base portion of said adjustment device and said second end of said flexible circuit is disposed between said movable portion of said adjustment device and said imager.

13. The camera of claim 10, wherein said flexible circuit includes a flexible portion that extends between said imager and said main circuit board to allow for movement of said movable portion relative to said base portion and to said main circuit board.

14. A camera for a vision system of a vehicle, said camera comprising:
a housing;
an imager disposed in said housing and comprising a pixelated imaging array having a plurality of photo-sensing elements, said imager operable to capture image data;
a lens assembly disposed at said housing;
wherein said imager is disposed at an adjustment device in said housing, and wherein said adjustment device is operable, responsive to a control signal, to adjust a position of said imager relative to said housing and said lens assembly;
wherein said adjustment device comprises a microelectromechanical system (MEMS) actuator; and
wherein said MEMS actuator is operable, responsive to the control signal, to (i) adjust said imager in directions parallel to a plane of said imager, (ii) adjust said imager in directions normal to the plane of said imager, and (iii) tilt said imager about an axis parallel to the plane of said imager.

15. The camera of claim 14, wherein said camera is configured to be disposed at a vehicle so as to have a field of view exterior of the vehicle.

16. The camera of claim 14, wherein said MEMS actuator is operable, responsive to the control signal, to rotate said imager about an axis through said imager.

17. The camera of claim 14, wherein said control signal comprises one selected from the group consisting of (i) a user input signal indicative of a user input of the vehicle, (ii) a control signal responsive to actuation or control of an accessory or system of the vehicle, and (iii) a control signal responsive to image processing of image data captured by said imager.

18. A camera for a vision system of a vehicle, said camera comprising:
a housing;
an imager disposed in said housing and comprising a pixelated imaging array having a plurality of photo-sensing elements, said imager operable to capture image data;
a lens assembly disposed at said housing;
wherein said imager is disposed at an adjustment device in said housing;
wherein said adjustment device comprises a base portion and a movable portion that is movable relative to said base portion responsive to a control signal;
wherein said base portion is affixed at a main circuit board of said camera and wherein said imager is affixed at said movable portion of said adjustment device;
wherein a flexible circuit electrically connects said imager with said main circuit board;
wherein said flexible circuit includes a flexible portion that extends between said imager and said main circuit board to allow for movement of said movable portion relative to said base portion and to said main circuit board;
wherein said adjustment device is operable, responsive to the control signal, to adjust a position of said imager relative to said housing and said lens assembly; and
wherein said adjustment device is operable, responsive to the control signal, to (i) adjust said movable portion and said imager in directions parallel to a plane of said imager, (ii) adjust said movable portion and said imager in directions normal to the plane of said imager, and (iii) tilt said movable portion and said imager about an axis parallel to the plane of said imager.

19. The camera of claim 18, wherein said control signal comprises one selected from the group consisting of (i) a user input signal indicative of a user input of the vehicle, (ii) a control signal responsive to actuation or control of an accessory or system of the vehicle, and (iii) a control signal responsive to image processing of image data captured by said imager.

20. The camera of claim 19, wherein said adjustment device comprises a microelectromechanical system actuator.

* * * * *